United States Patent Office 3,321,506
Patented May 23, 1967

3,321,506
BORATE AMINE SALT
Edwin C. Knowles, Poughkeepsie, N.Y., and Edward L. Kay, Akron, Ohio, assignors to Texaco Inc., New York, N.Y., a corporation of Delaware
No Drawing. Original application Jan. 17, 1961, Ser. No. 83,173, now Patent No. 3,185,644, dated May 25, 1965. Divided and this application Oct. 1, 1964, Ser. No. 400,875
6 Claims. (Cl. 260—462)

This invention relates to novel amine salts of boron-containing "acids." More particularly, this invention relates to certain intra-molecular substituted amine salts of tetra-covalent boron "acids" more particularly defined below. This application is a divisional of a copending application S.N. 83,173 filed on Jan. 17, 1961, now U.S. Patent 3,185,644.

The usefulness of many organo-boron compounds such as borate esters as lubricating oil additives has been seriously hindered by their lack of hydrolytic stability. An advantage of the boron compounds of the present invention is that they are hydrolytically stable, oxidation stable and thermally stable in both storage and use. The novel amine salts of the present invention are formed by the reaction of a hydroxy substituted amine and a tri-hydrocarbyl borate and are useful as load carrying additives for mineral and synthetic base lubricating oils.

The present invention is concerned with the novel amine salts of tetra-covalent boron "acids," known as intramolecular type salts, and represented by the following general formula:

$$(RO)_3\text{—B—O—R'—}\overset{+}{N}HR''R'''$$

wherein R is a monovalent hydrocarbyl radical containing one or more carbon atoms to about 30 carbon atoms, R' is a divalent hydrocarbylene radical containing 1 to 10 carbon atoms and R'' and R''' are hydrogen or monovalent hydrocarbyl radicals containing 1 to 24 carbon atoms. The acid amine salt is useful in lubricating oil compositions in a concentration sufficient to lend load carrying properties to the lubricating oil, e.g. concentrations usually between 0.05 and 5.0 weight percent.

The term hydrocarbyl when used herein denotes a monovalent hydrocarbon radical and the term hydrocarbylene when used herein denotes a divalent hydrocarbon radical.

The compositions of the present invention are prepared by the reaction of a hydroxy substituted amine with a tri-alkyl or -aryl borate to form the intra-molecular substituted amine salts of the tetra-covalent boron "acid."

The hydroxy substituted amines employed in the formation of the novel amine salt of the intra-molecular tetra-covalent boron "acids" are represented by the formula:

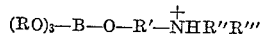

wherein R' is a divalent hydrocarbylene radical containing 1 to 10 and preferably 2 to 6 carbon atoms or an ethylene radical and R'' and R''' are hydrogen or a monovalent hydrocarbyl radical containing 1 to 24 and preferably a lower alkyl radical containing 1 to 8 carbon atoms. Examples of effective hydroxy substituted amines are N-phenyl N-ethyl aminoethanol, N,N-diethyl aminoethanol, t-$C_{11}$-$C_{14}$ aminoethanol, octyl aminoisopropanol, octyl aminobutanol and o-aminophenol.

The intra-molecular tetra-covalent boron "acids" employed in the formation of the present invention are transitory compounds and as such do not exist in the isolated state. They do, however, form stable salts.

The "acids" are formed by reaction of a tri-alkyl, or tri-aryl borate with a hydroxy substituted amine which immediately, as the parenthesis in the equation below indicates, is neutralized by the amine portion thereof to form the salt which may be illustrated by the following general equation:

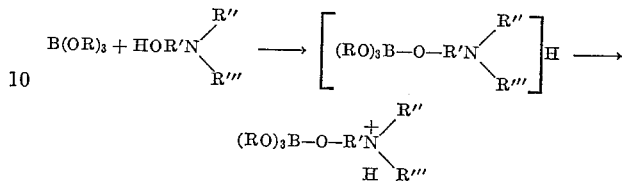

wherein the values for R, R', R'' and R''' are the same as previously indicated.

The amine salts of the present invention are illustrated by the following: N,N-diethylaminoethylate boro trimethylate, N-phenyl-N-ethyl-aminoethylate boro tri-n-propylate N,N-diethylaminoethylate boro tri-n-propylate, octyl amino ethylate boro tri-n-propylate and t-$C_{11}$-$C_{14}$ amino ethylate boro-tri-n-propylate.

The preparation of the specific novel acid amine salts of the tetra-covalent boron "acids" of the present invention are illustrated in the following examples.

*Example 1.—Preparation of N,N-diethylaminoethylate boro trimethylate*

234 grams, 2.0 mols, N,N-diethylaminoethanol were added to 207 grams, 2.0 mols, tri-methyl borate, the pot temperature rose from 27° C. to about 30° C. The reaction product was a clear water-white liquid.

*Example 2.—Preparation of N-phenyl-N-ethyl aminoethylate boro tri-n-propylate*

165 grams, 1.0 mol, N-phenyl-N ethyl-ethanol amine were added to 188 grams, 1.0 mol of tri-n propyl borate, no exothermic reaction took place. The reaction mixture was refluxed for one hour and the reaction product was a clear light amber liquid.

*Example 3.—Preparation of N,N-diethyl aminoethylate boro tri-n-propylate*

117 grams, 1.0 mol, N,N-diethyl aminoethanol were added to 188 grams, 1.0 mol, tri-n-propyl borate, as the aminoethanol was added a white precipitate formed which dissolved upon further addition of the N,N-diethyl amino ethanol. The pot temperature rose from 30 to 34° C.

*Example 4.—Preparation of t-($C_{11}$-$C_{14}$) amino ethylate boro tri-propylate*

110 grams (0.5 mol) t-($C_{11}$-$C_{14}$) amino ethanol was added slowly to 86 grams (0.46 mol) of tri-n-propyl borate. The temperature rose from 27° C. to about 30° C. over a fifteen minute addition period. The reaction product was a clear water-white liquid.

The lubricating oils which can effectively employ the amine salts of boron-containing "acids" of this invention include both hydrocarbon and synthetic lubricating oils. The hydrocarbon oils found to be useful are those oils having a viscosity in the range required for lubricating fluids and in particular hydrocarbon mineral oils which include paraffin base, naphthene base, mixed paraffin-naphthene base and mineral oils of the residual or distillate type. The hydrocarbon lubricating base generally has been subjected to solvent refining to improve its oxidation and thermal stability and viscosity-temperature properties as well as solvent dewaxing to remove waxy components and to improve the pour properties of the oil. Broadly speaking, hydrocarbon lubricating oils having an SUS viscosity at 100° F. of between 50 to 2500 are particularly useful in the formulation of the improved lubricants.

The mineral lubricating oils to which the amine salts of this invention are added usually contain other additives designed to impart desirable properties thereto. For example, viscosity index improvers such as the polymethacrylates having a molecular weight ranging from 500 to 25,000 are usually included therein. The viscosity index improver normally used is a polymethacrylate having the following recurring structural unit:

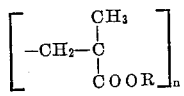

wherein R is an aliphatic radical ranging from butyl to stearyl and $n$ is an integer of more than 1.

The use of various metal base organic type additives has been found effective and are generally incorporated in the lubricating oils, particularly, those oils used in high speed, spark ignition and diesel engines to reduce ring sticking, minimize lacquer formation and carbon deposits.

The hydrocarbon lubricating oils may also contain other additives, such as metal sulfonates to afford additional detergent-dispersant properties, metal dialkyl dithiophosphates to afford additional corrosion and oxidation resistance, antifoam agents such as silicone polymers in the amount of about 5 to 200 parts per million, etc.

Synthetic lubricants which can be prepared are broadly described as esters of hydrocarbyl carboxylic acids. They are high molecular weight materials of lubricating oil characteristics derived from alcohols which are usually aliphatic alcohols containing 1 or more hydroxyl radicals and monocarboxylic acids which are usually aliphatic carboxylic acids containing 1 or more carboxylic acid radicals.

Widely used synthetic ester lubricants are aliphatic diesters of aliphatic dicarboxylic acids containing 6 to 12 carbon atoms. From the standpoint of cost and availability, the preferred dibasic acids are adipic acid, sebacic acid and azelaic acid. The aliphatic alcohols used to form the diesters usually contain at least 4 carbon atoms and up to 20 or more carbon atoms. $C_6$–$C_{18}$ alcohols are most commonly used. Ether alcohols such as Cellosolve and Carbitol may also be used in the formation of the aliphatic diesters of organic dicarboxylic acids used as the lubricating base in the compositions of this invention. Alcohols containing 2 or more hydroxyl radicals and no hydrogen substituted on the beta carbon atom such as trimethylol propane and pentaerythritol have proven particularly effective in formulating stable high temperature ester lubricants.

Examples of alkyl esters of aliphatic carboxylic acids are the following: di-isooctyl azelate, di-2-ethylhexyl sebacate, di-2-ethylhexyl azelate, di-2-ethylhexyl adipate, di-lauryl azelate, di-2-sec-amyl sebacate, di-2-ethylhexyl alkenyl succinate, di-2-ethoxyethyl sebacate, di-2-(2'-methoxyethoxy) ethyl sebacate, di-2-(2'-ethylbutoxy) ethyl sebacate, di-2-butoxyethyl azelate, di-2-(2'-butoxyethoxy) ethyl alkenylsuccinate, pentaerythritol tetracaproate and trimethylol propane tri-iso-octanoate.

In addition to such esters, polyester lubricants formed by a reaction of an aliphatic dicarboxylic acid, a dihydroxy compound and a monofunctional compound, which is either an aliphatic monohydroxy alcohol or an aliphatic monocarboxylic acid, in specified mol ratios are also employed as the synthetic lubricating base; polyesters of this type are described in U.S. 2,628,974 on Polyester Synthetic Lubricants, which issued to R. T. Sanderson on February 17, 1953. Polyesters formed by reaction of a mixture containing specified amounts of 2-ethyl-1,3-hexanediol, sebacic acid, and 2-ethylhexanol and by reaction of a mixture containing adipic acid, diethylene glycol and 2-ethylhexanoic acid illustrate this class of synthetic polyester lubricating bases.

Alkyl-substituted phenols are usually incorporated in lubricants as anti-oxidants. The preferred and most commonly used alkyl phenol anti-oxidants is 2,6-di-tertiary octylphenol; 2,6-di-tertiary amyl-4-methyl-phenol; and 2,6-di-isopropyl-4-methylphenol. Hindered phenols of this type are employed in concentrations between 0.1 and 1.0 weight percent.

Although hindered phenol type anti-oxidants are the most widely used anti-oxidants in lubricant compositions, aryl-substituted amine anti-oxidants, such as phenyl-naphthylamine, phenylene diamine, and diphenylamine, are also used in lubricants in conjunction with the extreme pressure additive of the invention. The amine anti-oxidants are employed in the same concentrations as the hindered phenol anti-oxidant.

Organic silicones are normally incorporated in lubricants to impart thereto anti-foam properties. The silicones are usually of the dialkyl or mixed alkyl-aryl silicone type. Dimethyl silicone is normally employed as the anti-foam agent. The silicone is incorporated in the lubricant by means of a kerosene concentrate containing 5 to 15 weight percent silicone. A very satisfactory anti-foam agent is a kerosene concentrate 10 weight percent dimethyl silicone. The kerosene concentrate is employed in an amount sufficient to provide a silicone polymer concentrations of from 50 to 250 parts per million based on the total lubricant composition.

The usefulness of the salts of the invention is shown by the excellent improvement in the load carrying ability of lubricating oil containing the amine salts of the present invention in the high speed gear scuff test. This test is called the I.A.E. Gear Test and is intended for the evaluation of the load carrying ability of the scuff limited load carrying ability of those lubricants used in reduction and accessory drives of turbo-jet and turbo-prop engines. The I.A.E. Gear Test is one of the requirements of the British specification D.E.R.D. 2487, "Lubricating Oil, Aircraft Turbine Engine, Synthetic Type." The I.A.E. Gear Test is also designed to evaluate the scuff limited, load carrying ability of aircraft gear hydrocarbon lubricants.

The results of the I.A.E. Gear Test on lubricating oil compositions containing the salts of the present invention are set forth in the following table:

TABLE I.—I.A.E. GEAR TEST

| Oil: | Tooth load, lbs. |
|---|---|
| Base Oil | 20 |
| Base Oil plus 0.7 wt. percent beta diethyl amino ethanolate boro tri-n-propylate | 85 |
| Base Oil plus 1.0 wt. percent t-($C_{11}$–$C_{14}$) amino ethanolate boro tri-n-propylate | 105 |

The Base Oil employed above consisted of a paraffin base crude which has been furfural refined, lightly acid treated, clay contacted and solvent dewaxed and has an SUS viscosity at 100° F. of 150. Table I demonstrates the improvement in the load carrying ability of the base oil when the additives of the present invention are included therein.

As is known in the art many organo borate compounds do not always perform as satisfactory additives for lubricants, fuels and the like because of their hydrolytic instability and it is to this end that the salts of the present invention demonstrate at least one of their advantages. The amine salt of the intra-molecular tetra-covalent boron "acids" of the present invention is hydrolytically stable in both water and lubricating oils.

Obviously, many modifications and variations of the invention as hereinbefore set forth may be made without departing from the spirit and scope thereof, and, therefore, only such limitations should be imposed as are indicated in the appended claims.

We claim:

1. An amine salt of a tetra-covalent boron acid having the following general formula:

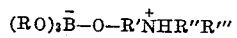

wherein R is a monovalent lower alkyl radical, R' is an ethylene radical and R'' and R''' are selected from the group consisting of hydrogen, phenyl, and a lower alkyl radical containing 1 to 8 carbon atoms.

2. An amine salt having the formula:

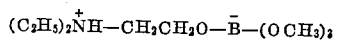

3. An amine salt having the formula:

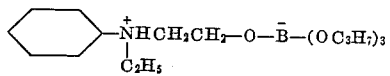

4. An amine salt having the formula:

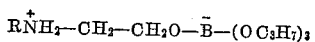

wherein R is an alkyl group containing 11 to 14 carbon atoms.

5. N,N-diethyl aminoethylate boro tri-n-propylate.
6. t-($C_{11}$–$C_{14}$) amino ethylate boro tripropylate.

References Cited by the Examiner

UNITED STATES PATENTS 3,185,644  2/1965  Knowles et al. _____ 260—462 X

CHARLES B. PARKER, *Primary Examiner.*

JOSEPH BRUST, *Examiner.*

DELBERT R. PHILLIPS, *Assistant Examiner.*